United States Patent [19]

Knavish

[11] 3,836,349
[45] Sept. 17, 1974

[54] METHOD OF MAKING GLASS
[75] Inventor: Leonard A. Knavish, Plum Borough, Pa.
[73] Assignee: PPG Industries, Inc., Pittsburgh, Pa.
[22] Filed: Oct. 26, 1972
[21] Appl. No.: 300,952

[52] U.S. Cl.................... 65/134, 65/137, 65/204, 65/356
[51] Int. Cl............................................. C03b 5/22
[58] Field of Search........................... 65/134–137, 65/125, 337, 203, 204, 354, 356

[56] References Cited
UNITED STATES PATENTS
2,049,600  8/1936  Wright............................. 65/204 X
2,119,949  6/1938  Blau et al............................. 65/134
3,536,470  10/1970 Brichard et al....................... 65/337

FOREIGN PATENTS OR APPLICATIONS
119,189  7/1943  Australia............................... 65/137

Primary Examiner—Robert L. Lindsay, Jr.
Attorney, Agent, or Firm—E. Kears Pollock; Donald Carl Lepiane

[57] ABSTRACT

Cooling of flat glass in a continuous glass-melting furnace from at least two locations within the molten glass, in combination with substantial cooling through the bottom of the furnace, enables operation of the furnace at heretofore unattainable throughputs. The use of submerged coolers in combination with bottom cooling reduces convection flow and convolutions in the glass, thereby improving the quality of the resulting glass. Signficantly reduced fuel consumption per ton of glass product is also achieved.

14 Claims, 7 Drawing Figures

METHOD OF MAKING GLASS

CROSS-REFERENCE TO RELATED APPLICATIONS

This application is related to Ser. No. 747,395, filed July 24, 1968, now abandoned, and to Ser. No. 116,368, filed Feb. 18, 1971 now U.S. Pat. 3,776,710, issued Dec. 4, 1973.

BACKGROUND OF THE INVENTION

In the manufacture of flat glass, whether by the plate process or the float process, measured quantities of glass-making ingredients are fed by a batch feeder into the feeding doghouse of a glass-melting furnace. The usual furnace is a relatively long structure constructed of refractory blocks and is generally divided into three sections, i.e., a melting section, a refining section, and a working section. In some furnaces, floaters or other barriers can be used to effectively separate the sections, at least at the surface of the glass. In other tanks, a drop arch terminating above the glass level effectively separates the melting portion from the refining portion. In any event, there is free communication between the melting and refining portions at the bottom of the furnace.

Heat is applied to the batch ingredients in the melting portion of the furnace, so as to produce a body of molten glass. As molten glass is removed as throughput at the working end of the tank, additional batch ingredients are introduced, generally on the surface of the melt, at the feeding end so as to maintain a substantially constant glass level in the furnace. As the batch is melted, the glass generally flows toward and into the refiner, where the glass is permitted to soak, i.e., come to a suitable forming temperature. The glass then flows into the working end of the furnace where a given depth of the molten glass is removed as throughput.

The movement of the glass through the furnace is influenced by the gravitational forces caused by the throughput in the system, as well as the temperature distribution throughout the furnace. Thus, in a conventional glass-melting furnace, two main thermal currents can be identified in the bath of molten glass, i.e., the surface or forward current and the return current. The surface current is formed by hot glass of relatively low density, and it moves from the melting section of the furnace through the refining section towards the working end where glass is withdrawn as throughput. Only a portion of the glass in the surface current is withdrawn at any given time. The remaining glass in the surface current cools so that its density increases, and the glass drops to the lower levels of the bath to join the return current, which circulates back towards the so-called "spring zone" of the tank furnace. In the melting zone of the furnace, the glass forming the return current becomes heated, rises to the surface at the "spring zone" and starts to circulate again in the surface current.

At a given surface zone in the forward current, the velocity of the surface glass $V_s$, may be expressed by the following simplified expression:

$$V_s = Ad^3/\eta L \, [\Delta_2 - \Delta_3/120 + \Delta_1/48] + 3Q/2d$$

in which $V_s$ = surface velocity, in centimeters per second, between the vertical planes at which temperatures are measured. These vertical planes must be remote from end walls and "spring zones" so that all velocities are essentially parallel to the surface;

$A = \rho g \beta$, wherein $\rho$ = mean density of the glass, in grams per cubic centimeter;

$g$ = acceleration gravity, in centimeters per second per second;

$\beta$ = thermal coefficient of cubical expansion, in reciprocal degrees Centigrade;

$\eta$ = the appropriate effective mean viscosity of the glass, in grams per centimeter-second;

$\Delta_1 = T_1 - T_2$;

$\Delta_2 = T_2 - T_4$;

$\Delta_3 = T_1 - T_3$;

$T_1$ = temperature at the surface at the upstream vertical plane, in degrees centrigrade;

$T_2$ = temperature at the surface of the downstream vertical plane, in degrees Centigrade;

$T_3$ = temperature at the bottom of the upstream vertical plane, in degrees Centigrade;

$T_4$ = temperature at the bottom of the downstream vertical plane, in degrees Centigrade;

$Q$ = volumetric throughput rate per unit width of tank, in square centimeters per second;

$d$ = depth of tank, in centimeters; and $L$ = length between the vertical planes at which temperatures are measured, in centimeters.

Since the throughput of the tank is only a portion of the total volume of glass moving forward in the system, the first term of the above expression, i.e., the convection term is larger than the second term, i.e., throughput term. Accordingly, the mass flow and heat flow in the system are influenced significantly by the convection term, and thus the length and depth of the tank, as well as the temperature gradients throughout the molten glass. In this latter regard, it is known that when the throughput reaches a certain magnitude, the working temperature increases beyond its desired level, and a tank operator must apply surface cooling, e.g., by introducing air or other suitable gas over the molten glass near the working end, to lower the working temperature of the glass. While it might be possible to increase the throughput somewhat by increasing the amount of surface cooling, it is important to note that the amount of surface cooling that can be employed is limited, since an excess of surface cooling will cause a condition of instability to occur in the molten glass, known as Rayleigh instability. When such Rayleigh instabilities occur, convolutions are formed in the molten glass. These convolutions manifest themselves as defects in the internal quality of the flat glass which is being produced. These defects are generally referred to as convoluted "striae" and are a form of "ream."

In practice, it has been found that the occurrence or development of the above described Rayleigh instabilities may be predicted with considerable accuracy by calculating for the molten glass a Rayleigh number, in accordance with an equation given hereinbelow. Thus, for molten glass, it can be calculated on theoretical grounds that even with perfectly homogeneous glass, instabilities of the kind mentioned above will occur when the Rayleigh number is greater than about 1,100, and practical experience with molten glass confirms this. Instabilities may occur at Rayleigh numbers less than 1,100 because of chemical heterogeneities in the glass. It is desirable to operate with a Rayleigh number as low as possible.

The Rayleigh number can be determined by the following equation:

$$\text{Rayleigh No.} = \rho^2 d^3 \Delta T \beta g C_p / \eta$$

where $\rho$ = density of the glass, in grams per cubic centimeter;

$d$ = depth of temperature-inversion point below the surface, in centimeters;

$\Delta T = T_s - T_i$, in degrees Centigrade;

$T_s$ = surface temperature of the glass, in degrees Centigrade;

$T_i$ = temperature at the point of inversion, in degrees Centigrade;

$\beta$ = coefficient of thermal expansion of the glass, in reciprocal degrees Centigrade;

$g$ = gravitational acceleration in centimeters per second per second;

$c_p$ = specific heat of the glass, in calories per gram per degree Centigrade;

= effective thermal conductivity of the glass, in calories per centimeter-second-degrees Centigrade; and $\eta$ = viscosity of the glass, in grams per centimeter-second.

With respect to the above equation and its relationship to surface cooling of molten glass, it will be appreciated that surface cooling, in any substantial amount, will result in the surface of the glass being at a temperature, $T_s$, which is lower than the maximum temperature, $T_i$, beneath the glass surface. In this situation, there is a temperature gradient in the glass and the maximum temperature, $T_i$, is located a certain distance, $d$, beneath the surface of the glass. The point at which the maximum temperature is located is generally referred to as the temperature-inversion point. As can be seen from the above equation, the Rayleigh number varies directly with the temperature difference $T_s - T_i$, and with the third power of the depth, $d$, of the temperature-inversion point. Accordingly, any increase in the temperature difference $T_s - T_i$ and/or the depth, $d$, of the temperature-inversion point will increase the Rayleigh number and thereby increase the likelihood of Rayleigh instabilities. In this latter regard, it will be noted that both $T_s - T_i$ and $d$ are increased with increased application of cooling to the surface of molten glass.

In view of the disadvantages associated with excessive convection flow and excessive surface cooling, attempts have been made to reduce convection flows in flat-glass melting furnaces. One reference teaches disposing a mechanical resistance to flow in the furnace, such as by providing a transverse wall on the bottom of the furnace across the path of the return current. Such a practice is relatively ineffective, because a mere physical barrier tends to have an effect proportionate to the velocity of the stream in which it is positioned and the glass with which we are concerned is quite slow-moving. An effect considerably greater can be obtained in molten glass by changing its viscosity. A decrease in glass temperature of 45° Centigrade will approximately double the viscosity, but the reference does not suggest the use of a transverse wall that would have the property of cooling the glass so substantially as to increase its viscosity by that much or more and thus decrease accordingly its convective-flow velocity.

Similarly, it has been disclosed that unstable convolutions may be reduced by reducing the cooling at the surface of the glass in a refiner and, in lieu thereof, applying forced cooling to the bottom of that mass of glass, for example, by blowing air across the outside of the bottom wall of the refiner. While both of these techniques reduce, somewhat, the convection flow and convolutions in the molten glass, they are of limited value since they do not materially increase the throughput of the furnaces with which they are employed.

SUMMARY OF THE INVENTION

In view of the foregoing, it is an object of the present invention to provide a method and apparatus for reducing the convection flow and convolutions in molten glass in a furnace for melting flat glass.

Another object of the present invention is to provide a method and apparatus for significantly increasing the throughput of a flat glass-melting furnace.

Yet another object is to provide a method and apparatus for producing flat glass wherein increased melt temperatures may be employed without causing unstable conditions in the working end of the apparatus.

Yet another object of the present invention is to provide a method and apparatus for improving the throughput of a flat-glass melting furnace, wherein the apparatus employed does not form an integral part of the furnace structure, thus enabling the apparatus to be disassociated from the furnace without having to shut down the furnace.

In accordance with the present invention, these and other objects and advantages are accomplished by submerging at least two elongated coolers in the glass mass in a flat-glass melting tank, downtank of the spring zone, while simultaneously extracting heat from the glass mass through the bottom of the tank. Surprisingly, the resulting glass mass is far more stable in its internal-flow characteristics than could possibly be predicted, and the internal quality and/or throughput are materially improved. No convolutions occur, or if they occur, their magnitude is materially reduced, and they can be eliminated by modifying the applied cooling. Furthermore, the application of in-glass submerged cooling in combination with substantial cooling through the bottom of the furnace quite advantageously changes the temperature-inversion and velocity curves, as will be hereinafter explained.

DESCRIPTION OF THE INVENTION

Figure 1:
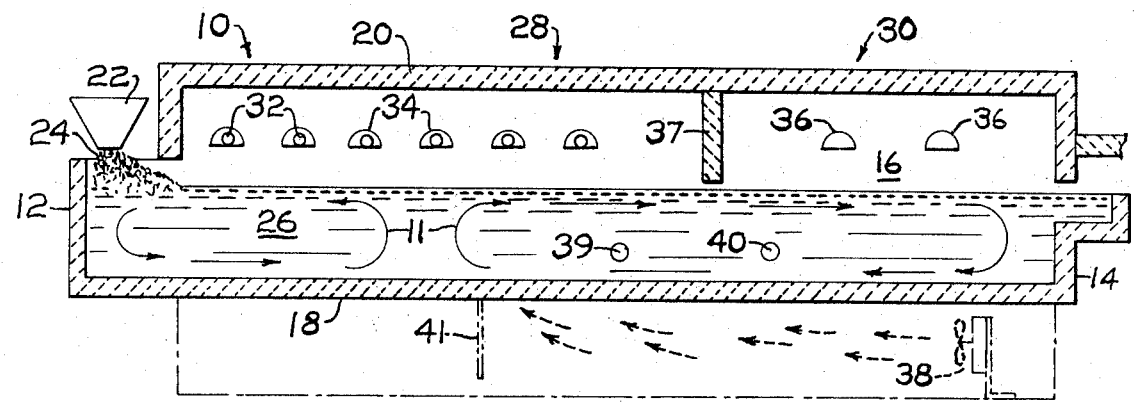
FIG. 1 is a vertical section through a typical glass-melting furnace incorporating this invention.

FIG. 1 shows a glass furnace 10, which is suitable for making flat glass and which is constructed generally of refractory blocks, so as to include a back wall 12, a front wall 14, side walls 16, a bottom 18, and a crown or roof 20. At the back wall 12, there is a batch feeder 22 which feeds glass-making ingredients 24 onto molten glass 26 in the furnace, so that they melt in the melting portion 28 of the furnace 10. The glass flows toward the working end adjacent to the front wall 14 and into the refining portion 30 of the furnace. Heat is applied by burners 32 through ports 34 in the side walls 16. A suitable fuel-air mixture is fed to the burners 34. Auxiliary or overhead cooling is applied by introducing ambient air through ports 36 in the side walls. In an alternative embodiment, the overhead cooling may be supplied by inserting hairpin coolers or other suitable radiation targets (not shown) through the ports 36.

In typical cases, the furnace 10 melts glass on the scale of 150 to 600 tons per day, and it accordingly has a floor area on the order of 750 to 3,000 square feet, a width of 10 to 45 feet and a length of 50 to 250 feet. Typically, such a furnace has a roof of silica refractory bricks, an inner lining of dense alumina bricks 3 to 20 inches thick in contact with the molten glass, and an outer lining of clay refractory bricks about 8 to 16 inches thick. The clay refractory bricks have considerably greater insulating power (lower thermal conductivity) than the alumina bricks and are considerably less costly, but their service life in contact with molten glass would be too poor to be tolerable. Alumina bricks, on the other hand, are usually regarded as too expensive and too thermally conductive to be used alone. Thus, there is usually used a furnace lined as indicated above, its lining having an overall thermal flux of over 1,000 BTU/hr.-ft.$^2$, generally on the order of 1,100 to 1,500 BTU/hr.-ft.$^2$.

The melting portion 28 is separated from the refining portion 30 by a drop arch 37.

According to this invention, a substantial flow of heat is extracted through the bottom wall 18 of the refiner. This may be accomplished, for example, simply by fabricating the bottom wall 18 from a relatively highly conductive refractory material and permitting ambient air to come into contact therewith. However, it is often desirable to augment such heat extraction by flowing air across the bottom wall 18. As illustrated in phantom in FIG. 1, this may be accomplished by disposing a fan or blower 38 below the tank 10 so that cooling air is directed across the bottom wall 18 and toward the melting end of the tank. A curtain 41 may be used to protect the melter portion from undue cooling. It is located preferably near the "spring zone" indicated by the opposing arrows 11, which show the convection flows typical of those obtained when using this invention. Under normal circumstances, the volume of air blown across the bottom 18 of the tank depends upon the temperature and pressure of the air, the thickness, construction and thermal conductivity of the tank bottom, the glass temperature and the amount of bottom cooling to be effected. However, regardless of the means chosen for extracting heat through the bottom wall 18, the present invention contemplates the extraction of at least about 1,000 BTU/hr.-ft.$^2$ and possibly as much as 4,250 BTU/ft.$^2$-hr. through the bottom wall in the refiner. This invention is contemplated for use only in connection with tanks having bottom wall 18 whose overall glass-to-ambient thermal resistance, $R_T$, is from about 0.32 up to about 2 ft.$^2$-hr.-°F/BTU, regardless of whether the bottom 18 is constructed of a single layer of refractory blocks, or several layers of refractory blocks of the same or different thermal resistances.

In addition to extracting at least 1,000 BTU/hr.-ft.$^2$ through the bottom of the refiner, cooling is applied directly to the glass in the tank with at least two submerged coolers 39 and 40, each of which may comprise concentrically arranged stainless steel pipes. Typically, each of the coolers 39 and 40 comprises a 2-inch-diameter inner pipe and a 3-inch-diameter outer pipe, wherein cooling water is fed into the inner pipe and withdrawn from the outer pipe. The rate at which the cooling water is passed through each cooler is largely a matter of choice, with flow rates on the order of about 50 to about 80 gallons per minute being typical. Typical cooling-water temperature rises are from about 25° to about 35° Fahrenheit, with inlet temperatures normally ranging from about 80° to about 135° Fahrenheit. Either of the submerged coolers 39 and 40 may be placed in either the return or forward convection currents, with placement of both in the return current being preferred. In addition, it is preferred that each cooler 39 and 40 extend across substantially the entire width of the furnace 10. In this latter regard, the practical limitations of extending an elongated cooler from one side of the furnace 10 to the other indicate that each cooler 39 and 40 should be comprised of a set of two halves, such that each half is inserted into the molten glass from an opposite side of the furnace. It is not necessary that the proximal ends of the cooler halves actually contact each other, so long as the set of cooler halves traverses substantially the entire width of the tank 10. The cooling capacity of the submerged coolers 39 and 40 may be the same or different, and each cooler (or set of cooler halves) may vary in a furnace about 30 feet wide from a minimum capacity of about $1.0 \times 10^6$ BTU/hr. In a typical embodiment, each of the coolers (or sets of coolers) 39 and 40 is operated at about the same cooling capacity, the capacity generally ranging from about $1.0 \times 10^6$ to about $2.5 \times 10^6$ BTU/hr. In a preferred embodiment, each cooler is operated to extract about $1.8 \times 10^6$ BTU/hr.

Figure 2:
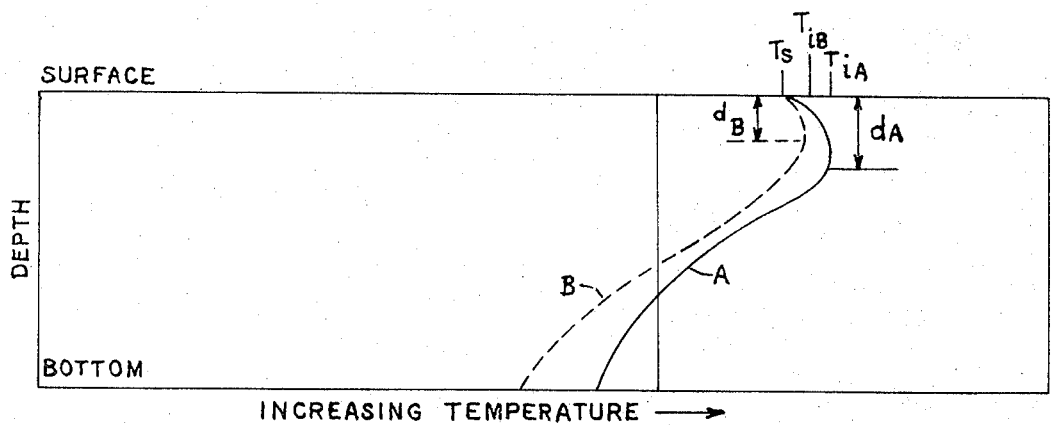
FIG. 2 is a schematic graphic representation of temperature-inversion curves, illustrating the normal curve resulting from the prior art and the curve resulting from the use of this invention.

Referring now to FIG. 2, there is shown a schematic graphic representation illustrating for a given vertical plane 42 in the refiner the temperature of the glass in a melting furnace as a function of the depth within the glass at which the respective temperatures would be located. Curve A, in solid lines, is illustrative of the temperature distribution which is normally observed in the refiner of a glass tank whose glass-to-ambient thermal resistance, $R_T$, is about 2 ft.$^2$-hr.-F°/BTU. Curve B, on the other hand, illustrates the corresponding temperature distribution normally observed when practicing the present invention, and when using the same tank as for Curve A. It will be noted from FIG. 2, that the depth of the temperature inversion $d_A$ is greater than the corresponding depth $d_B$. Similarly, it will be noted that the temperature difference between the glass at the surface and at the temperature inversion point $T_s - T_{tA}$ is greater than the corresponding temperature difference $T_s - T_{tB}$. Accordingly, in view of the above discussed equation for determining Rayleigh numbers, it will be appreciated that the likelihood of operating a glass melting furnace under conditions of Rayleigh instability are markedly reduced when practicing the present invention. It might also be noted that the temperature differential between the surface glass and the bottom glass is increased, when the invention is used, thereby increasing the heat flow from the surface glass to the bottom glass.

Figure 3:
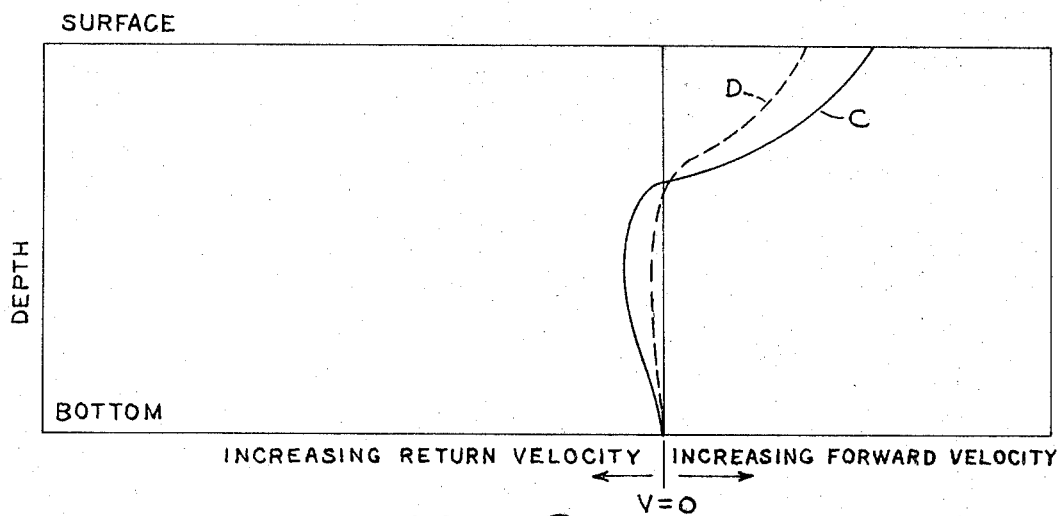
FIG. 3 is a schematic graphic representation illustrating the usual velocity profiles resulting from the prior art, and from the use of this invention.

The velocity curve C, in FIG. 3, illustrates the curve normally obtained when producing flat glass in a tank whose glass-to-glass ambient thermal resistance is about 2 ft.$^2$-hr.-°F/BTU. Curve D, on the other hand, is typical of the curve that would be obtained when producing flat glass in the same tank as in the case of curve C, but when practicing the present invention. As illustrated, other things being equal, the surface flow of the glass tends to be slower when practicing the present invention. Thus, the cooling rate can be lower, thereby reducing the Rayleigh number and avoiding thermal instabilities. This means that when the invention is practiced, it is possible to operate with greater throughput and/or higher melter temperatures without needing overhead cooling that would create Rayleigh instabilities.

Figure 4:
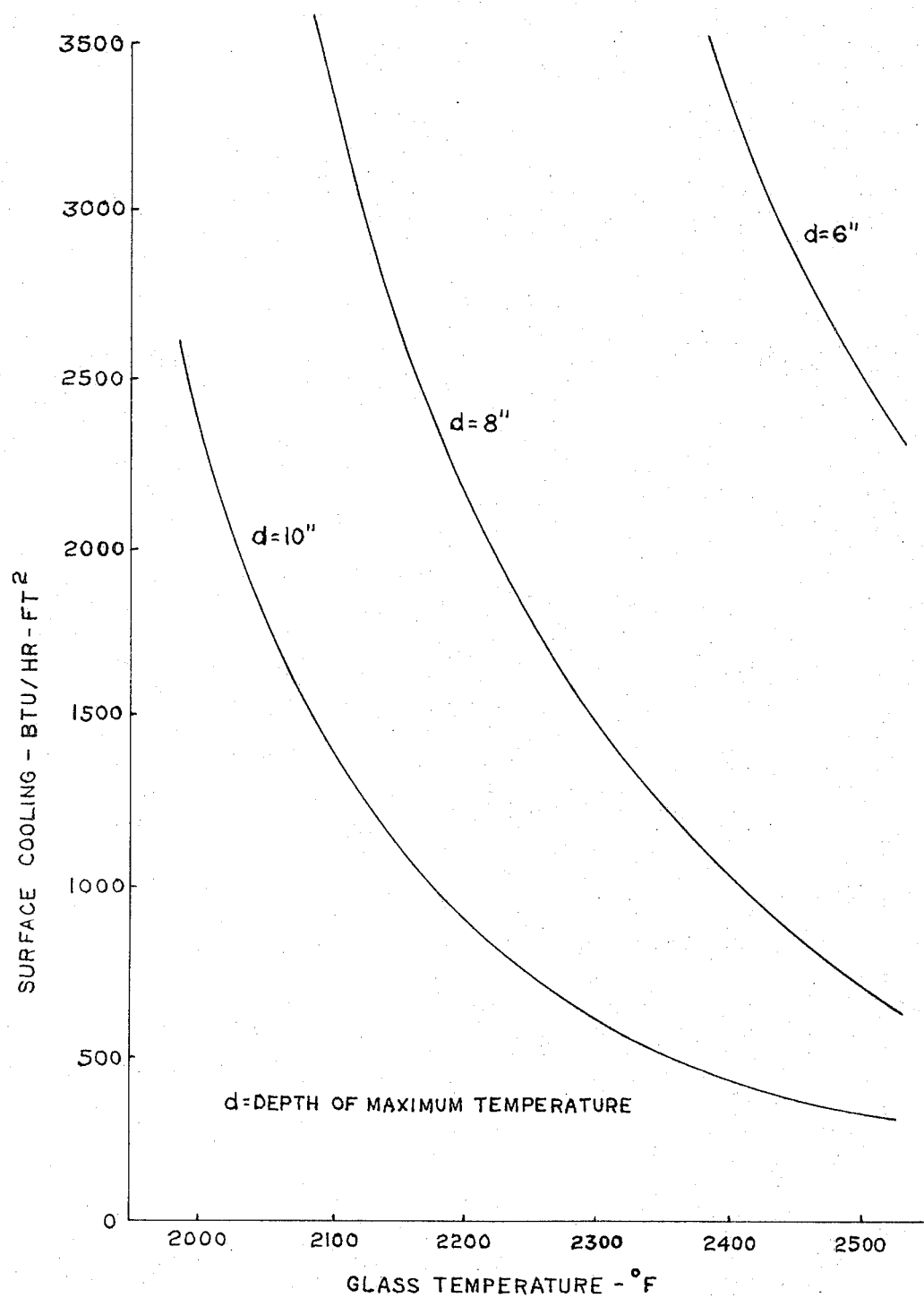
FIG. 4 is a typical graphic representation of the steady-state surface cooling rate that will cause "Rayleigh instabilities" and thus, convoluted "striae;"
Figure 5:
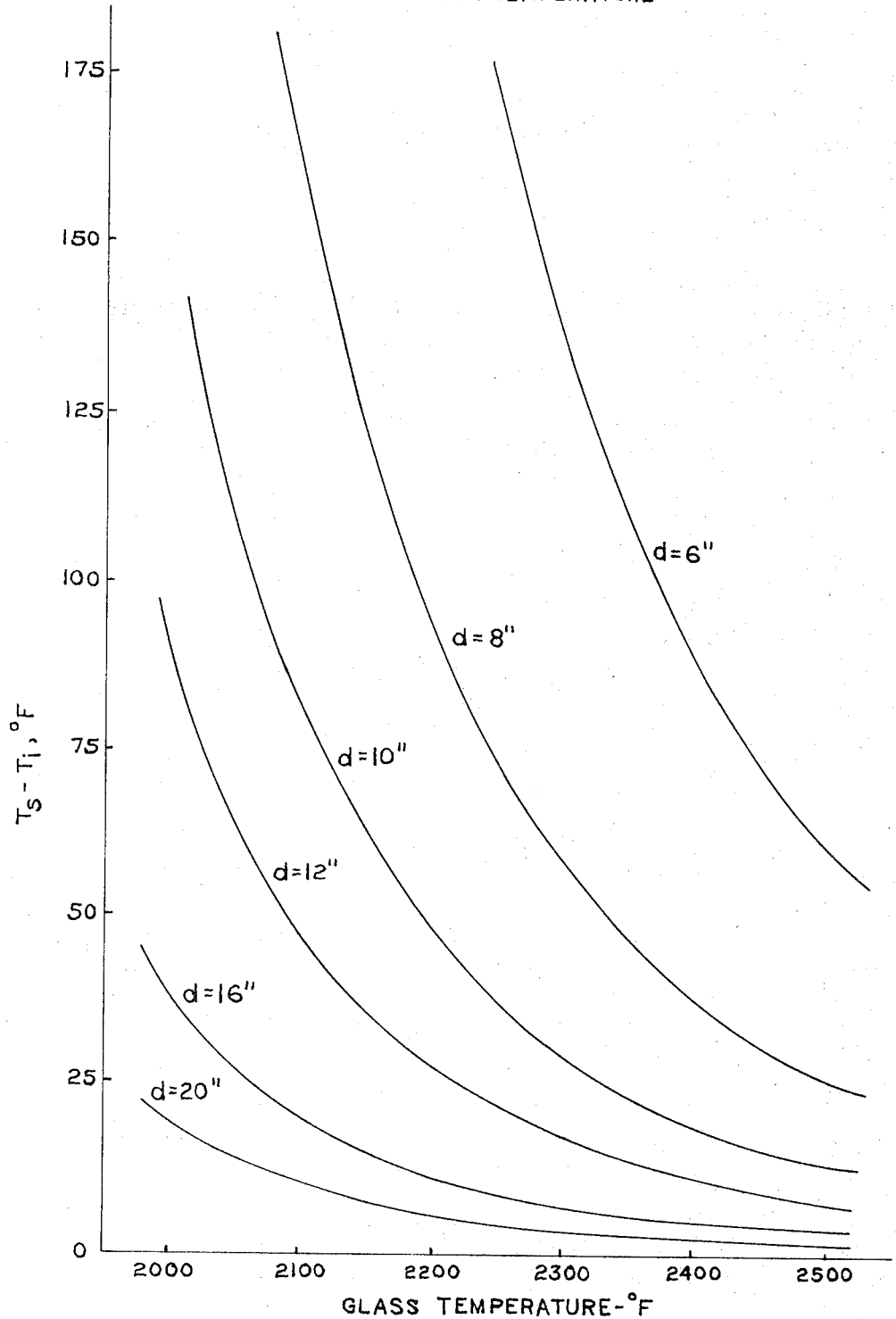
FIG. 5 is a typical graphic representation of the temperature difference between the surface of the glass and the maximum temperature of glass which will result in "Rayleigh instabilities;"

In this latter regard, reference is made to FIG. 4 which illustrates the steady-state surface cooling rate that will produce Rayleigh instabilities in a perfectly homogenized typical clear soda-lime-silica glass, i.e., a critical Rayleigh number of about 1,100. FIG. 4 is plotted for various depths, $d$, of maximum glass temperature. Since the use of submerged coolers will decrease the depth of the temperature inversion, $d$, it is apparent from FIG. 4 that the present invention enables the use of higher rates of surface cooling without causing "ream." Similarly, FIG. 5 illustrates that larger temperature differences between the surface of the glass and the maximum glass temperature can be tolerated by practicing the present invention. Although FIGS. 4 and 5 are representative of graphs applicable to clear glass, the critical Rayleigh number of about 1,100 is independent of the type of glass involved, and graphs similar to FIGS. 4 and 5 could be drawn for other types of glass, e.g., heat-absorbing glass.

In order to evaluate the internal quality of glass produced, striaegrams of glass samples were made and compared. Striaegrams are made by cutting samples from a ribbon of glass, immersing the samples in a liquid having an index of refraction the same as that of the glass (this eliminates any reflections of light from the cut), passing a light through the glass sample from edge to edge, and photographing the image so produced. Moreover, it is usual in the photographic process to expand the thickness dimension of the glass and contract the edge length, to make the striaegrams easier to read.

Figure 6:
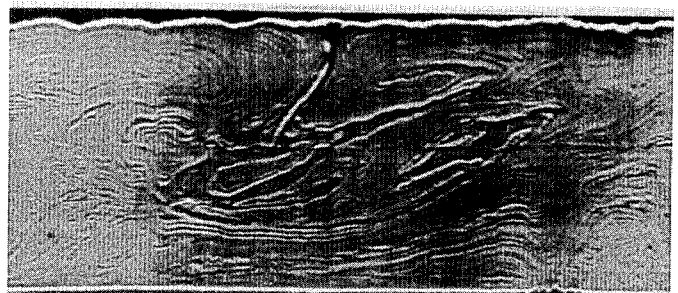
FIG. 6 is a striaegram of a glass sample illustrating the effects of an instability in the glass mass.
Figure 7:
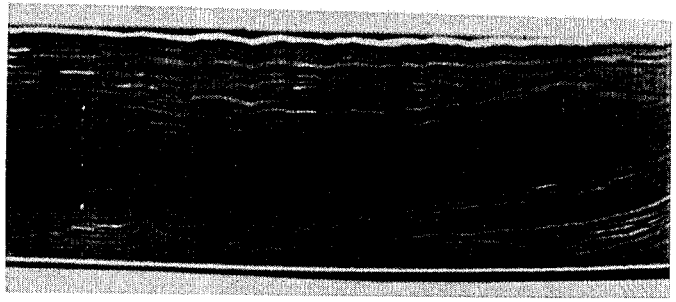
FIG. 7 is a striaegram of a glass sample illustrating glass that, like that made with this invention, is substantially free of the effects of such instability.

Striaegram photographs of quarter-inch-thick glass are illustrated as FIGS. 6 and 7. FIG. 6 is a striaegram that shows glass having Rayleigh-instability defects. FIG. 7 is a striaegram that shows the desirable condition, i.e., no such defects. Even without the present invention, it is possible to get a product that gives desirable striaegrams, resembling FIG. 7, but at a lower rate of furnace throughput and at a greater consumption of energy per ton of product than when the present invention is practiced.

These striaegrams are of an architectural heat-absorbing glass, but similar ones can be obtained for clear glass. Similar striaegrams for clear glass would not give indications quite as easily noticeable and distinct, but the effects are just as commercially important. The examples which follow relate to the production of clear flat glass. Other things being equal, the benefits of the invention are greater when making clear flat glass than when making heat-absorbing flat glass.

The invention will be more fully appreciated in view of the following examples which compare the results obtained in the absence of submerged coolers (Example I) with those obtained when using the present invention (Example II).

EXAMPLE I

Flat glass was produced in a glass-melting tank 168 feet in length and 30 feet in width. The melting portion of this tank was 99 feet in length while the refining portion was 69 feet in length. A conventional drop arch separated the melting and refining portions of the tank. The glass depth was 43 inches throughout the length of the melting and refining section of the tank. The tank bottom was comprised of 12 inches of clay refractory and 8 inches of fused-cast high-density alumina, the latter in contact with the glass.

In addition to the auxiliary or overhead cooling necessary to bring the glass down to the normal working temperature of 2,050 degrees Fahrenheit, about 1,125 BTU/hr.-ft.$^2$, or about $2.4 \times 10^6$ BTU/hr., was removed from the glass through the tank bottom. Approximately 1,450 BTU/hr.-ft.$^2$, or about $3 \times 10^6$ BTU/hr. was conducted through the tank crown. Experience gained over a period of about ten months indicated that the maximum tonnage that could be obtained without incurring excessive "ream" was about 355 tons/day. The throughput, as well as the amount of heat required per ton of throughput, the overall fuel requirements and the auxiliary cooling requirements were noted as set forth in Table 1.

EXAMPLE II

The operation of the glass-melting tank described in Example I was modified by inserting two sets of submerged coolers into the molten glass, the first set being inserted through the No. 1 skim kiln (16 feet uptank of the drop arch) and the second set through the No. 2 skim kiln (23 feet downtank of the drop arch). Each set of coolers comprised two separate halves; each half comprising a closed end concentric pipe arrangement inserted into the glass from opposite sides of the tank so that the two halves approximated a single elongated cooler disposed across the width of the tank. Each of the cooler set was fabricated from AISI Type 446 stainless steel, and each half had an inner pipe of 2-inch outside diameter and an outer pipe of 3-inch outside diameter. The closed end of each half had a rounded, machined cap of AISI Type 446 stainless steel. Approximately 65 gallons per minute of water at 120° Fahrenheit was introduced into each inner pipe. The cooling water was withdrawn from the outer pipes at about 150° Fahrenheit. Each set of coolers was submerged about 24 inches from the glass surface, so as to be disposed in the return convection current. Approximately $1.8 \times 10^6$ BTU/hr. was extracted from the molten glass by each set of coolers, a total of about $3.6 \times 10^6$ BTU/hr. being removed by the submerged coolers. As is the case with Example I, some auxiliary overhead cooling, e.g., hairpin coolers and/or cooling gases, was employed to bring the glass to working temperature. The amount of overhead cooling is noted in Table 1 In addition to the auxiliary overhead cooling, about 1,125 BTU/hr.-ft.$^2$ was extracted from the glass through the tank bottom, and about 1,450 BTU/hr.-ft.$^2$ was dissipated through the tank crown. The tank was operated for a sufficient period of time to determine the maximum throughput that could be obtained without the development of "ream." Again, the throughput, the amount of heat required per ton of throughput, the overall fuel requirements and the auxiliary cooling requirements are set forth in Table 1.

TABLE 1

|  | Example I | Example II |
|---|---|---|
| Throughput Tons/day | 355.2 | 399.7 |
| Overall Fuel Consumption, cu. ft./hr. | 139,500 | 149,325 |
| Fuel Consumption per ton, BTU/ton | $9.57 \times 10^6$ | $9.11 \times 10^6$ |
| Auxiliary Overhead Cooling, BTU/hr. | $4 \times 10^6$ | $1.4 \times 10^6$ |

The above Examples and Table indicate that by practicing the present invention, the tonnage of a given melting tank was increased by about 13 percent, i.e., about 45 tons per day, without sacrificing glass quality.

In this latter regard, when the tonnage of Example I was increased above about 355 tons per day, without the use of submerged coolers, effects of instabilities existed in the glass. The effects of the instabilities were similar to those seen in FIG. 6. On the contrary, even with tonnages of 399 tons per day, glass produced in accordance with the present invention was similar to that depicted in FIG. 7.

Obviously, increased tonnage, alone, is of significant economic importance. However, practicing the present invention is doubly rewarding since the fuel consumption per ton of throughput was decreased by about 460,000 BTU/ton even though melter temperatures were increased, and at the same time that the throughput was being increased.

The invention may be used in the production of float glass, and it is also applicable to the manufacture of other flat glass wherein it is important that the glass produced be of high quality as respects freedom from distortion, such as vertically drawn sheet glass. Moreover, the invention is not necessarily limited to use with conventional gas-fired or oil-fired continuous tank-type melters of the kind indicated above, but rather is applicable more generally to equipment for melting flat glass wherein there is a body of molten glass that is being brought to a desired working temperature while additions to it made at one location and removals from it (to the working operation) are made at another location, and a convective flow pattern exists that brings hot glass on a top surface towards the location of removal, regardless of the particular mode of effecting the initial melting of glass added to the body of glass in question.

In comparison with commercial float-glass manufacturing operations conducted before its discovery, the instant invention affords distinct advantages beyond those discussed above.

Between the physical flow-retardant effect of submerged coolers spaced from the bottom of the molten glass in the refiner and the additional flow-retardant effect obtained by reducing the temperature of the glass and thereby increasing its viscosity, the convection-flow circulation downstream of the spring zone is considerably decelerated. This makes it possible, at a given level of throughput to maintain a greater (steeper) temperature gradient in the glass near the surface, i.e., comparing surface glass temperature in the vicinity of the spring zone with surface-glass temperature in the working area. In other words, for glass at a given exit temperature, the glass at the spring zone and elsewhere in the melter is relatively hotter. This is helpful in that higher melter temperatures mean faster and more surely thorough melting and mixing of the batch materials, but offsetting to some extent this obvious advantage is the consideration that higher melter temperatures cause increased wear of melter refractories, and it was accordingly not obvious that such greater melter temperatures would prove, on balance, to be desirable. In other words, one predictable disadvantage of the practice herein taught is danger of increased refractory wear. It is indeed possible to practice the inventive concept to such an extent that this does become a real disadvantage, but for the most part, this has been found not to be a disadvantage that outweighs the other benefits obtained.

Another consideration is that it appears essentially self-defeating to operate a process wherein money is spent upon both heating and cooling. The heating, to melt the batch is unavoidable, but those skilled in the art have a natural tendency to regard cooling with suspicion and to practice it only to the minimum extent necessary, since it involves a loss of heat values that need elsewhere, at some expense, to be supplied to the system. The cooling involves an added risk of equipment failure, and those skilled in the art have been led to avoid it. The inventive teaching is that despite this, when the cooling is done properly, it pays off handsomely.

It is to be understood that the above-described embodiments are merely illustrative of the principles of the present invention and that minor variations may be made therein which will not depart from the spirit and scope of the invention as defined in the appended claims.

I claim:

1. In a method of manufacturing glass in which glass-making ingredients are fed into a glass melting furnace comprising a melting section and a refining section wherein heat is applied to the ingredients to melt the same and form a mass of molten glass at least a portion of which flows from the melting section of the furnace to the refining section thereof to be refined and then at least a portion of the refined glass flows to exit end of the furnace where molten glass is continuously removed and temperature gradients exist in the mass of molten glass in the refining section from the top surface to the bottom surface of the mass of molten glass wherein the temperature gradients cause (1) convection flow of the mass of molten glass along a generally circuitous path having a downstream direction adjacent the top surface of the mass of molten glass in the refining section and an upstream direction adjacent the bottom surface of the mass of glass in the refining section and (2) convolutions in the mass of molten glass adjacent the top surface of the mass of molten glass in the refining section, the improvement which comprises:

disposing first means for extracting heat in the mass of glass in the refining section at selected discrete regions along the circuitous path in the upstream flow transverse to the direction of flow of the mass of molten glass;

extracting heat by way of the first heat extracting means from each of the discrete regions as the molten glass moves past the regions wherein the rate of flow of the glass as it moves past the regions is reduced;

disposing second means for extracting heat at the bottom of the melting furnace;

extracting heat by way of the second heat extracting means from the mass of molten glass as the mass of molten glass moves along the upstream portion of the circuitous path; and performing said extracting steps to extract heat from the mass of glass as it moves along the circuitous path to alter the temperature gradients such that the convolutions in the mass of molten glass are minimized.

2. The improved method as recited in claim 1, wherein each of the discrete regions traverses substantially the entire width of the melting furnace.

3. The improved method as recited in claim 1 wherein said step of extracting heat by the first heat extracting means extracts at least $2 \times 10^6$ BTU for a throughput of molten glass of between about 6–25 tons and said step of extracting heat by the second heat extracting means extracts at least $1 \times 10^3$ BTU/hr.-ft.$^2$.

4. The improved method as recited in claim 3, wherein the first heat extracting means are at least two heat exchangers extending across substantially the entire width of the melting furnace and said step of disposing the first heat extracting means includes:

disposing the heat exchangers in spaced relation to each other and in the upstream direction of the circuitous path such that molten glass flows between the heat exchangers and the bottom of the furnace.

5. The improved method as recited in claim 4, wherein said step of extracting heat by way of the second heat extracting means is accomplished by:

flowing cooling air along the bottom of the refining section of the furnace.

6. The improved method as recited in claim 4 wherein said performing step maintains the Rayleigh number of the mass of glass below about 1,100 to minimize convolutions in the mass of molten glass wherein the Rayleigh number being determined by the equation Rayleigh No. $= \rho^2 d^3 \Delta T \beta g \, Cp/\eta$ where $\rho$ = density of the glass
$d$ = depth of temperature inversion
$\Delta T = T_s - T_i$
$T_s$ = surface temperature of glass
$T_i$ = temperature at point of inversion
$\beta$ = coefficient of thermal expansion of the glass
$g$ = gravitation acceleration
$c_p$ = specific heat of the glass
$K$ = effective thermal conductivity of the glass
$\eta$ = viscosity of the glass 7. The improved method as recited in claim 1, wherein said step of extracting heat by way of the second heat extracting means is accomplished by:

flowing cooling air along the bottom of the refining section of the furnace.

8. The improved method as recited in claim 1, wherein said performing step maintains the Rayleigh number of the mass of glass below about 1,100 to minimize convolutions in the mass of molten glass wherein the Rayleigh number being determined by the equation Rayleigh No. $= \rho^2 d^3 \Delta T \beta g \, Cp/\eta$ where $\rho$ = density of the glass
$d$ = depth of temperature inversion
$\Delta T = T_s - T_i$
$T_s$ = surface temperature of glass
$T_i$ = temperature at point of inversion
$\beta$ = coefficient of thermal expansion of the glass
$g$ = gravitation acceleration
$c_p$ = specific heat of the glass
$K$ = effective thermal conductivity of the glass
$\eta$ = viscosity of the glass 9. In a method of manufacturing glass in which glass-making ingredients are fed into a glass melting furnace comprising a melting section and a refining section wherein heat is applied to the ingredients to melt the same and form a mass of molten glass at least a portion of which flows from the melting section of the furnace to the refining section thereof, to be refined and then at least a portion of the refined glass flows to exit end of the furnace where molten glass is continuously removed, and temperature gradients exist in the mass of molten glass from the top surface to the bottom surface of the mass of molten glass wherein the temperature gradients cause (1) convection flows of the mass of molten glass along a generally circuitous path having a downstream direction adjacent the top surface of the mass of molten glass and an upstream direction adjacent the bottom surface of the mass of glass and (2) convolutions in the mass of molten glass adjacent the top surface of the molten glass in the refining section, the improvement which comprises:

submerging a first elongated cooler in the upstream convection flow and across substantially the entire width of the furnace;

adjusting the first cooler to extract from the mass of molten glass between about $1 \times 10^6$ and about $2.5 \times 10^6$ BTU for a throughput of molten glass of between about 6–25 tons;

submerging a second elongated cooler in the upstream convection flow spaced from the first cooler and across substantially the entire width of the furnace;

adjusting the second cooler to extract from the molten glass between about $1 \times 10^6$ and $2.5 \times 10^6$ BTU for a throughput of molten glass of between 6–25 tons; and extracting at least about 1,000 BTU/hr.-ft.$^2$ from the mass of molten glass through the bottom of the furnace, whereby the extraction of heat through the furnace bottom, in combination with the cooling effected by the first and second submerged coolers, alters the temperature gradients in the mass of molten glass to minimize the convolutions therein.

10. The method as recited in claim 9, wherein heat is extracted through the bottom of the furnace by flowing air therealong.

11. An improved flat-glass melting furnace of the type having a melting section, a refining section and a working end wherein glassmaking ingredients can be melted at the melting section to form a mass of molten glass which flows, at least in part to the refining section of the furnace, and then flows to the working end of the furnace where molten glass is continuously removed, and wherein temperature gradients extend from the top of the molten mass to the bottom thereof, the temperature gradients cause (1) convection flow of the molten glass about a generally circuitous path having a downstream direction adjacent the top of the mass and an upstream direction adjacent the bottom of the mass and (2) convolutions in the mass of molten glass adjacent the top surface of the mass of molten glass in the refining section, the improvement which comprises:

at least two cooling means mounted in the furnace in spaced relation to each other and disposed a predetermined distance below the surface of the glass in the circuitous path of the molten glass to be melted in the furnace, each of said cooling means being located within the mass of glass between a spring zone in the mass of glass and the working section, each of said cooling means extending substantially entirely across the width of the furnace and each of said cooling means extracting from a mass of molten glass about $1 \times 10^6$ to about $2.5 \times 10^6$ BTU for a throughput of molten glass of about 6–25 tons and means for extracting at least about 1,000 BTU/hr.-ft.$^2$ from said mass of molten glass through the bottom of the furnace.

12. The apparatus as recited in claim 11, wherein each of said cooling means comprises water-cooled-pipe means removably disposed within the furnace.

13. The apparatus as recited in claim 11, wherein said means for extracting heat through the bottom of the furnace comprises means for flowing cooling air therealong.

14. The apparatus as recited in claim 11, wherein the bottom of the furnace, at least in the refiner portion, has a maximum glass-to-ambient thermal resistance of about 2 ft.$^2$-hr.-°F/BTU.

* * * * *

UNITED STATES PATENT OFFICE
CERTIFICATE OF CORRECTION

Patent No. 3,836,349      Dated September 17, 1974

Inventor(s) Leonard A. Knavish

It is certified that error appears in the above-identified patent and that said Letters Patent are hereby corrected as shown below:

Column 3, line 5,   $\rho^2 d^3 \Delta T \beta_g C_p / n$ should be   $\rho^2 d^3 \Delta T \beta_g C_p / K n$ Column 3, line 23, add -- $K$ --.

Claim 6, Column 11, line 56,   $\rho^2 d^3 \Delta T \beta_g C_p / n$ should be   $\rho^2 d^3 \Delta T \beta_g C_p / K n$ Claim 8, Column 12, line 11,   $\rho^2 d^3 \Delta T \beta_g C_p / n$ should be   $\rho^2 d^3 \Delta T \beta_g C_p / K n$ Claim 12, Column 14, line 11, after "The" insert --improved--.
Claim 13, Column 14, line 14, after "The" insert --improved--.
Claim 14, Column 14, line 18, after "The" insert --improved--.

Signed and sealed this 17th day of December 1974.

(SEAL)
Attest:

McCOY M. GIBSON JR.
Attesting Officer

C. MARSHALL DANN
Commissioner of Patents